Patented Apr. 25, 1939

2,156,219

UNITED STATES PATENT OFFICE 2,156,219

CHEMICAL PLUGGING OF BRINE-BEARING STRATA

Thomas H. Dunn, Tulsa, Okla., assignor to Stanolind Oil & Gas Company, Tulsa, Okla., a corporation of Delaware No Drawing. Application June 5, 1937, Serial No. 146,661

3 Claims. (Cl. 166—21)

During oil and gas well drilling and producing operations, brine-bearing strata are commonly encountered and it frequently becomes desirable or necessary to shut off these brine-bearing strata, which are sometimes referred to as water-bearing strata.

This can be done by cementing but where the brine-bearing strata and oil-bearing strata are in juxtaposition, it is highly desirable to have some selective method which will affect the brine-bearing strata without affecting the oil-bearing strata. My invention relates to this problem and provides a new and improved method and reagent for the selective chemical plugging of brine-bearing strata.

It is an object of my invention to provide an efficient and inexpensive method and reagent for the aforementioned purpose. Another object of my invention is to provide a method for the selective plugging of brine-bearing strata using only a single reagent and thus avoiding the disadvantages of many prior methods which require two separate reagents to react within the brine-bearing strata. A further object of my invention is to provide a reagent for the aforementioned purpose which is soluble in water and which will react with naturally occurring brines to give an insoluble precipitate of such nature as to clog effectually the pores of brine-bearing strata.

It is advantageous to use a reagent which is water soluble in the strict sense of that term since such reagents are less viscous and far easier to handle than reagents which are colloidally or otherwise dispersed. However, most water soluble reagents which can be used to precipitate insoluble substances within the pores of brine-bearing strata are unsatisfactory and the precipitates are easily washed out. This may be due to the fineness of the crystal grains formed or to other reasons.

Naturally occurring waters encountered in oil and gas operations are almost always high in chloride content and such waters are referred to herein as brines. I have found that these brines react very readily with soluble lead salts such as lead nitrate [Pb(NO$_3$)$_2$] to precipitate lead chloride. Moreover, I have found that, unlike many precipitates, this lead chloride when precipitated within the pores of the brine-bearing strata, acts as an extremely and unusually effective plugging agent.

The details of a typical experiment performed to test the effectiveness of this invention are as follows: A core section of East Texas Field Woodbine consolidated sand, 1.25 inches in length by .75 inch in diameter was placed in a core holder of such design that practically no dead end space existed with the core in place in the holder. The permeability of the core to a filtered oil field brine was carefully determined; permeability being a measure of the ability of a porous medium, in this case porous sandstone, to transmit a fluid such as brine. Thus, the higher the permeability of a porous body, the lower is the resistance it offers to a flow of fluid through it, and conversely, the lower the permeability of a porous body, the higher is the resistance which it offers to flow of fluid through it. A solution of lead nitrate made up in the proportion of 15 parts by weight of lead nitrate to 100 parts by weight of water, was slowly forced into the core, entering at the top. On the appearance of the first drop of lead nitrate solution passing through the core, the core holder was shut in and allowed to stand for 20 minutes. Filtered brine of the same kind used for determining the initial permeability of the core specimen was then forced into the core, passing into the core holder at the bottom and out at the top, this being the same direction of flow as was used in the initial permeability determination. The brine was forced through the core and the permeability was noted at intervals until no further change in permeability occurred. It was found in this case that the permeability of the core to brine had decreased 88.4% as compared with the permeability of the core before the treatment with the lead nitrate solution; that is, the ability of the core to transmit water after the treament was only 11.6% as great as it was initially.

In actual oil field operations where the reagent is forced back into the formation a considerable distance and affects a much greater length of fluid path the plugging is practically complete. To check further the efficiency of this plugging method, the same experiment was repeated using the most effective chemical plugging agents heretofore employed in the art in place of the lead nitrate solution, all conditions and factors affecting the results being maintained constant. It was found that the plugging efficiency of the lead nitrate solution was extremely good compared with the chemical plugging agents heretofore used in the art.

Since the lead nitrate solution does not react with oil, this method of treating an oil well to shut off brine flow from the brine-bearing formations involves no plugging of oil filled pores or crevices such as occurs when two reagents are introduced to form the precipitate. The method of shut off is, therefore, selective and affects only the pores or crevices of the brine-bearing stratum or strata.

The manner of applying the treatment to an oil well depends upon the particular conditions encountered, but in any event involves introducing into the well, under a pressure greater than the normal well pressure, an aqueous solution of a lead salt such as lead nitrate in amount sufficient to enter the pores and pass outward from the well a considerable distance. The introduction is then preferably stopped while continuing the pressure for a period of at least five minutes and preferably at least half an hour to allow time for the precipitate formed to coagulate. Normal operations are then resumed.

The lead nitrate concentration of the solution introduced into the well can be varied within considerable limits. I prefer to use concentrations of from about 3% lead nitrate to about 20% lead nitrate.

In place of lead nitrate other soluble lead salts can be used; for instance, basic lead nitrate, lead perchlorate, lead persulfate or lead dithionate. Lead salts which are not soluble in pure water can be used in solution in other reagents. However, lead nitrate is by far the most practical and most convenient lead salt for use in practicing my invention.

While I have described my invention in terms of specific embodiments thereof, it is to be understood that these are by way of illustration and not by way of limitation and I do not mean to be bound thereby but only to the scope of the appended claims which should be construed as broadly as the prior art will permit.

I claim:

1. A one reagent method for plugging the pores of a brine-bearing stratum which comprises introducing a solution of a lead salt into said stratum and into contact with the brine within the pores of said stratum to precipitate lead chloride therein and thus plug said pores.

2. A one reagent method for plugging the pores of a brine-bearing stratum which comprises introducing a solution of lead nitrate into said stratum under pressure and into contact with the brine within the pores of said stratum to precipitate lead chloride therein and thus plug said pores.

3. A one reagent method for plugging the pores of a brine-bearing stratum which comprises introducing an aqueous solution containing about 3–20% lead nitrate into said stratum and into contact with the brine within the pores of said stratum to precipitate lead chloride therein and thus plug said pores.

THOMAS H. DUNN.